(12) United States Patent
Cymbal et al.

(10) Patent No.: US 8,915,521 B2
(45) Date of Patent: Dec. 23, 2014

(54) STEERING COLUMN TELESCOPING BUSHING WITH ROLLER SPRINGS

(71) Applicants: William D. Cymbal, Freeland, MI (US);
Melvin L. Tinnin, Clio, MI (US);
Arthur W. Nellett, Davison, MI (US);
Richard K. Riefe, Saginaw, MI (US);
Ravi Ravindra, Saginaw, MI (US)

(72) Inventors: William D. Cymbal, Freeland, MI (US);
Melvin L. Tinnin, Clio, MI (US);
Arthur W. Nellett, Davison, MI (US);
Richard K. Riefe, Saginaw, MI (US);
Ravi Ravindra, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 13/832,537

(22) Filed: Mar. 15, 2013

(65) Prior Publication Data
US 2014/0260760 A1 Sep. 18, 2014

(51) Int. Cl.
*B62D 1/18* (2006.01)
*B62D 1/187* (2006.01)

(52) U.S. Cl.
CPC ................................ *B62D 1/187* (2013.01)
USPC .............. 280/775; 280/777; 74/492; 74/493; 464/162; 464/167; 464/169

(58) Field of Classification Search
USPC .................. 280/775, 777; 464/162, 167, 169; 74/492, 493
See application file for complete search history.

(56) References Cited

U.S. PATENT DOCUMENTS

| | | | |
|---|---|---|---|
| 2,198,039 A | | 4/1940 | Onions et al. |
| 2,965,734 A | | 12/1960 | Timmerman |
| 3,007,668 A | | 11/1961 | Dall |
| 3,081,639 A | | 3/1963 | Hauptman |
| 3,120,371 A | | 2/1964 | Dall |
| 3,237,471 A | | 3/1966 | Wunsch |
| 3,402,574 A | * | 9/1968 | Hauptman ................ 464/63.1 |
| 4,103,514 A | * | 8/1978 | Grosse-Entrup ............ 464/167 |
| 4,705,491 A | * | 11/1987 | Andersson ................ 464/167 |
| 4,898,566 A | * | 2/1990 | Hakansson ................ 464/167 |
| 5,345,679 A | * | 9/1994 | Lennon et al. ........... 29/898.055 |
| 6,350,203 B1 | * | 2/2002 | Zernickel ................ 464/167 |
| 6,505,969 B2 | * | 1/2003 | Senger ...................... 384/56 |
| 6,533,459 B2 | * | 3/2003 | Podhajecki et al. ............ 384/57 |
| 6,542,417 B2 | * | 4/2003 | Higashiho ................ 365/189.14 |
| 6,942,417 B2 | * | 9/2005 | Schwarzbich ............ 403/109.1 |
| 7,198,297 B2 | * | 4/2007 | Satou et al. .................. 280/777 |
| 7,798,525 B2 | | 9/2010 | Cymbal et al. |
| 2005/0070365 A1 | * | 3/2005 | Riefe et al. ................ 464/162 |
| 2006/0039747 A1 | * | 2/2006 | Shoda et al. ............ 403/109.1 |

(Continued)

*Primary Examiner* — Paul N Dickson
*Assistant Examiner* — Darlene P Condra
(74) *Attorney, Agent, or Firm* — Cantor Colburn LLP

(57) ABSTRACT

An adjustable steering column for a vehicle and a bushing for the adjustable steering column are provided. The adjustable steering column includes a column jacket having a lower jacket extending along a first axis and an upper jacket telescopically coupled to and extending with the lower jacket. The lower and upper shafts are configured to selectively move telescopically relative to one another for telescope adjustment of the steering column. The adjustable steering column also includes a bushing positioned between the lower jacket and the upper jacket, the bushing including a support portion extending along a length between the lower jacket and upper jacket, the support portion including a first seating area, and a roller portion positioned in the first seating area, the roller portion configured to engage at least one of an outer surface of the lower jacket and an inner surface of the upper jacket.

21 Claims, 7 Drawing Sheets

(56) References Cited

U.S. PATENT DOCUMENTS

2007/0039403 A1* 2/2007 Manwaring et al. ............ 74/492
2008/0000316 A1* 1/2008 Kurokawa ...................... 74/493
2008/0229866 A1   9/2008 Cymbal et al.
2009/0200783 A1* 8/2009 Cymbal ........................ 280/775
2009/0272220 A1* 11/2009 Klukowski ...................... 74/493
2010/0307280 A1* 12/2010 Schnitzer ........................ 74/493

* cited by examiner

STEERING COLUMN TELESCOPING BUSHING WITH ROLLER SPRINGS

BACKGROUND OF THE INVENTION

The following description relates to a bushing in a steering column, and in particular, a roller bushing disposed between two telescoping jackets in a steering column.

A steering column may include a steering shaft that is adjustable, for example, in a telescope direction and/or a rake direction. The steering column may include an outer jacket and an inner jacket positioned telescopically therein. The inner jacket and outer jacket are configured for relative movement to adjust the steering shaft in a telescope direction. A plastic bushing may be positioned between the inner jacket and the outer jacket to facilitate relative motion. In particular, the plastic bushing facilitates a relative sliding motion, where one jacket slides relative to the plastic bushing and the other jacket, or vice versa. However, the sliding motion may result in a friction force that adversely affects the relative telescoping movement. In addition, plastic bushing may be susceptible to binding between the jackets.

In addition, during a crash or impact, the steering shaft maybe exposed to an overturning moment resulting from a vertical component force applied to one of the jackets. When the overturning moment is applied, friction may be increased at the plastic bushing between the jackets to an extent that relative sliding or telescope motion between the jackets is unsuitably limited.

Accordingly, it is desirable to provide a bushing for a telescoping component of a steering shaft that may withstand high loads and overturning moments to maintain suitable relative telescoping movement in the steering shaft.

SUMMARY OF THE INVENTION

According to an exemplary embodiment of the present invention, there is provided an adjustable steering column for a vehicle, the adjustable steering column including a column jacket having a lower jacket extending along a first axis and an upper jacket telescopically coupled to and extending with the lower jacket. The lower and upper jackets are configured to selectively move telescopically relative to one another for telescope adjustment of the steering column. The adjustable steering column also includes a bushing positioned between the lower jacket and the upper jacket. The bushing includes a support portion extending along a length between the lower jacket and upper jacket, the support portion including a first seating area, and a roller portion positioned in the first seating area, the roller portion configured to engage at least one of an outer surface of the lower jacket and an inner surface of the upper jacket.

According to another exemplary embodiment of the present invention, there is provided a bushing for an adjustable steering column, the bushing configured to be positioned between a lower jacket and an upper jacket of a telescoping column jacket of the adjustable steering column. The bushing includes a support portion extending in a longitudinal direction and having a first seating area and a roller portion positioned in the first seating area, the roller portion having at least one roller section configured to rollingly engage at least one of the lower jacket and the upper jacket.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
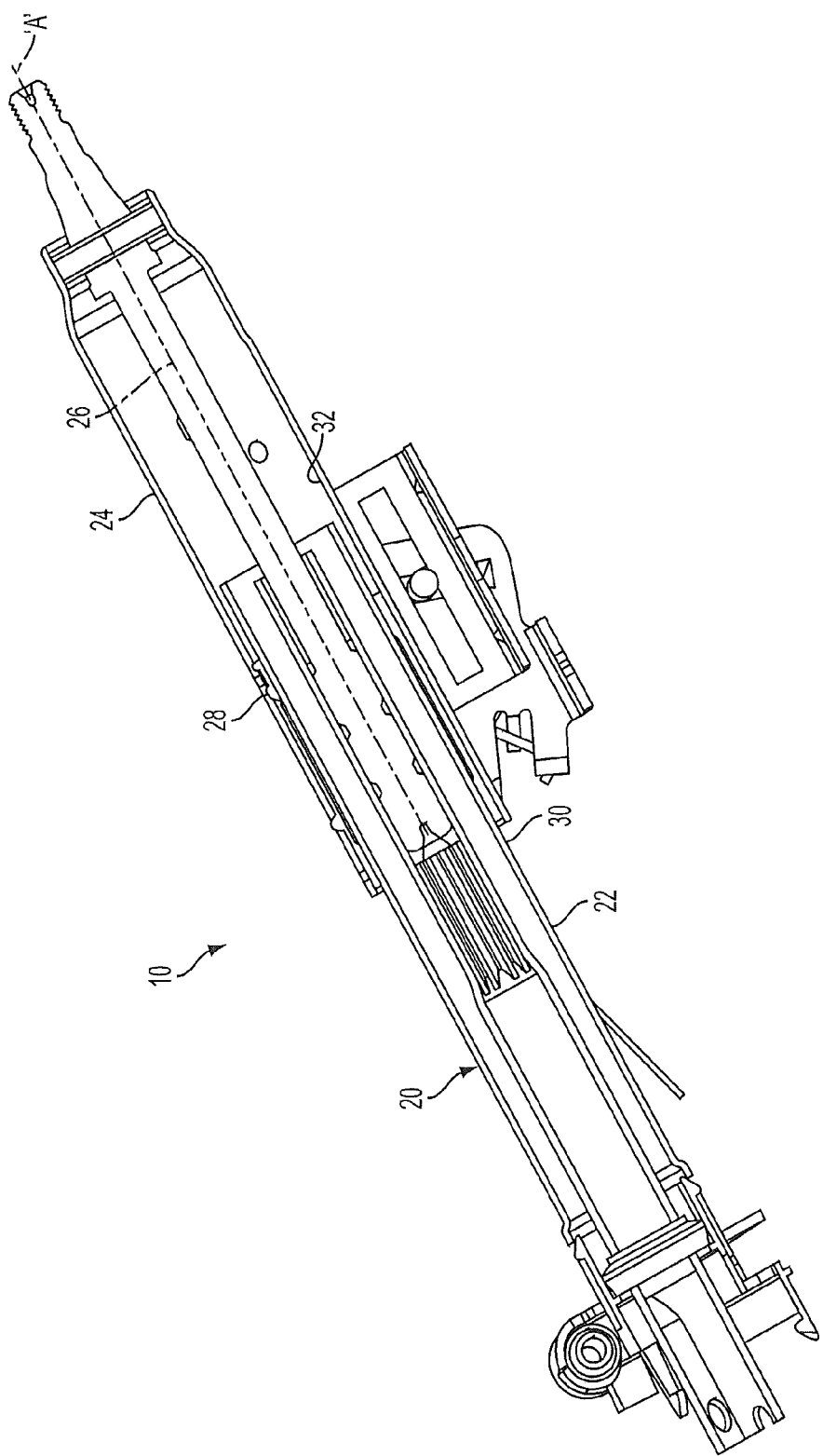
FIG. 1 illustrates a steering column having a bushing assembly according to an exemplary embodiment of the present invention.

Referring now to the Figures, where the invention will be described with reference to specific embodiments, without limiting same, an adjustable steering column 10 having a telescope bushing is provided. FIG. 1 shows the steering column 10 having a column jacket 20. The column jacket 20 includes a lower jacket 22 and an upper jacket 24. In an exemplary embodiment, the lower jacket 22 and upper jacket 24 are circular in cross section, but not limited thereto. The lower jacket 22 is telescopically received within the upper jacket 24. However, it is understood that the upper jacket 24 may be telescopically received within the lower jacket 22 in an alternative embodiment. The upper jacket 24 is configured for telescoping movement relative to the lower jacket 22 either during selective adjustment by an operator or in response to a high impact or force during a crash or other high-impact scenario. In an exemplary embodiment, the lower jacket 22 and upper jacket 24 extend coaxially along an axis 'A'. A steering shaft 26 extends within the column jacket 20. A bushing 28 is positioned between an outer surface 30 of the lower jacket 22 and an inner surface 32 of the upper jacket 24. In an exemplary embodiment, the bushing 28 is concentrically positioned about the axis 'A'.

Figure 2:
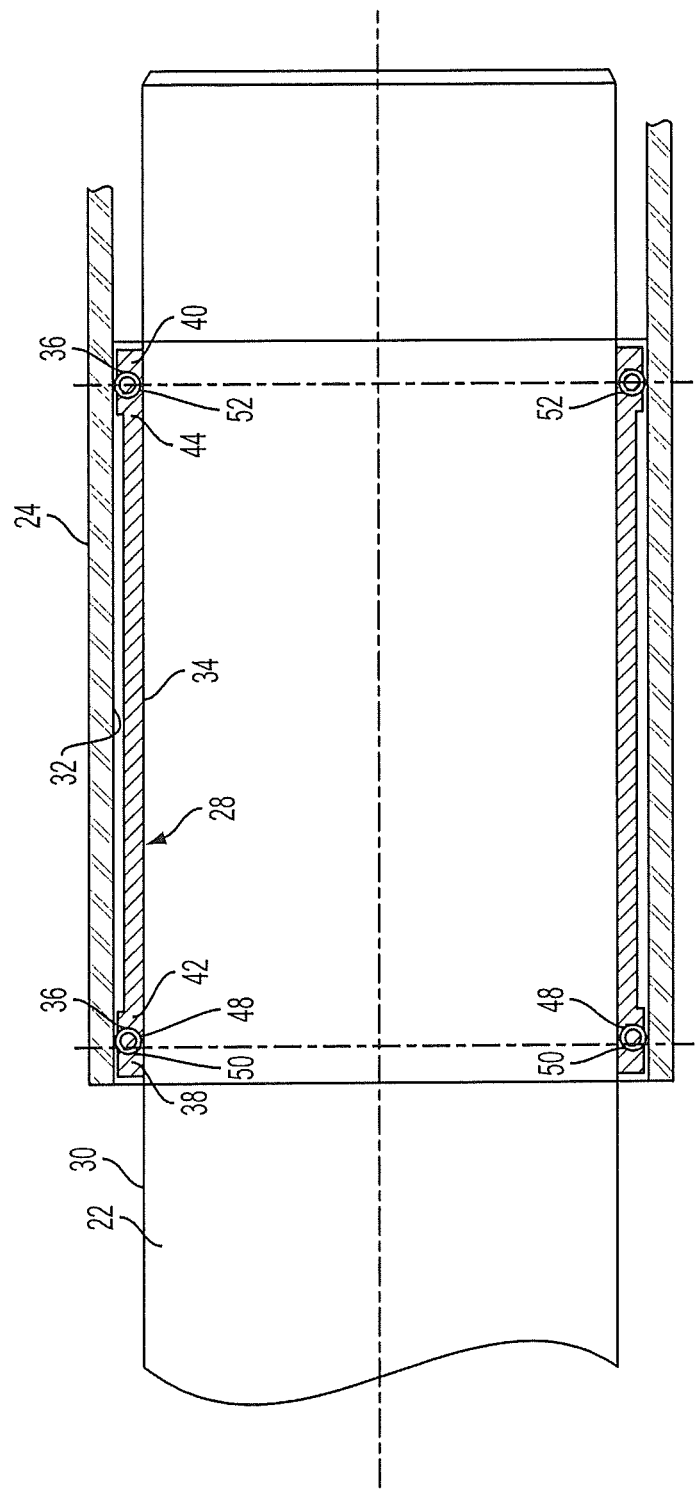
FIG. 2 illustrates a cross section of the bushing assembly in a steering column according to an exemplary embodiment of the present invention.

FIG. 2 is a cross section of the steering column showing the bushing 28. The bushing 28 includes a support portion 34 and a roller portion 36. In an exemplary embodiment, the support portion 34 is formed as a substantially cylindrical part positioned between the outer surface 30 of the lower jacket 22 and the inner surface 32 of the upper jacket 24. The support portion 34 may be formed as a complete cylinder or a partial cylinder. The support portion 34 includes a first end 38 and a second end 40, and co-extends with the lower jacket 22 and upper jacket 24. The support portion 34 also includes a first seating area 42 positioned at the first end 38 of the support portion 34 and a second seating area 44 positioned the second end 40 of the support portion 34. Each seating area is configured to receive a different roller portion 36. It is understood that the support portion 34 may include additional seating areas configured to receive additional roller portions.

Figure 3:
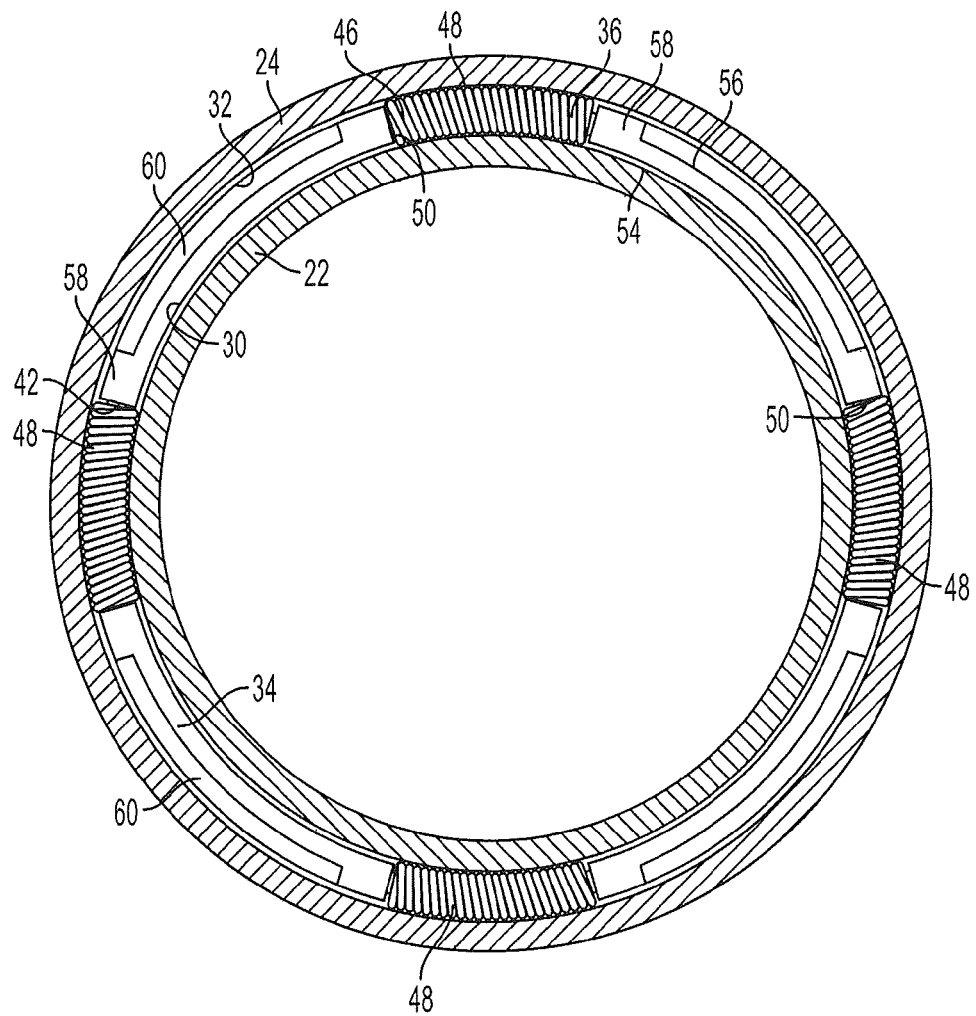
FIG. 3 illustrates a front cross section of the bushing assembly in a steering column according to an exemplary embodiment of the present invention.

FIG. 3 is a cross section view of the steering column in the direction of the axis 'A'. Referring to FIGS. 2 and 3, in an exemplary embodiment, the roller portion 36 is formed as a spring 46 having a plurality of roller sections 48 (See also FIG. 2). Each roller section 48 is configured to rollingly engage and bear against the inner surface 32 of the upper jacket 24 and the outer surface 30 of the lower jacket 22. The roller section 48 may also engage and bear against the support portion 34.

Referring to FIG. 3, in an exemplary embodiment, the support portion 34 extends circumferentially about the outer surface 30 of the lower jacket 22. The first seating area 42 may include a plurality of first seats 50 disposed circumferentially around the support portion 34. In an exemplary embodiment, the plurality of first seats includes four seats 50 spaced apart equally along the circumference of the support portion 34. It is understood that the second seating area 44 may be formed similarly to the first seating area 42, to include a plurality of second seats 52 (see FIG. 2) spaced apart along the circumference of the support portion. Although not required, in an exemplary embodiment, the same number of seats may be formed in the first and second seating areas 42, 44, and the plurality of first and second seats 50, 52 may positioned at the same circumferential positions, or at circumferential positions rotated relative to one another. In an exemplary embodiment, the first and second seats 50, 52 may be formed as windows extending through a respective seating area 42, 44 of the support portion 34. It is understood that the above description is provided for the purposes of example, and the present invention is not limited thereto. For example, any number of suitable seats may provided in first and second seating areas 42, 44, and the seats may be equally spaced apart or spaced apart varying distances along the circumference of the support portion.

With further reference to FIG. 3, the support portion 34 extends around the outer surface 30 of the lower jacket 22 and has an inner surface 54 that generally matches a profile of the outer surface 30 of the lower jacket 22. An outer surface 56 of the support portion 34 includes projections 58 adjacent to the first seats 50 that extend to, and are configured to engage the inner surface 32 of the upper jacket 24. Recesses 60 are formed between the projections 58 leaving a gap between the outer surface 56 of the support portion 34 the inner surface 32 of the upper jacket 24. It is understood that the second end 40 of the support portion 34 may be formed similar to the first end 38, having projections 58 and recess 60 positioned along its circumference. The projections 58 may be used to position and secure the support portion 34 between the lower jacket 22 and upper jacket 24, for example, by interference or snap fit. It is also understood that the projections 58 and recesses 60 may only be positioned at the first and second ends 38, 40, for example at the first and second seating areas 42, 44, or any additional seating areas.

Referring still to FIG. 3, the roller portion 36 may include a plurality of roller sections 48. In an exemplary embodiment, the roller sections 48 are respectively formed as coiled sections of the spring 46. The spring 46 may include four coiled roller sections 48, spaced equally apart in a circumferential direction. However, it is understood that any suitable number of roller sections 48 may be formed along the spring 46 and spaced apart at varying distances along the circumference.

Referring to FIGS. 2 and 3, in an exemplary embodiment, the roller portion 36 may include two roller portions 36, with one roller portion 36 positioned at the first end 38 of the support portion 34 in the first seating area 42 and another roller portion 36 positioned at the second end 40 of the support portion at the second seating area 44. As detailed above, and shown in FIGS. 2 and 3, the roller portions 36 may be springs 46, each having a plurality of roller sections 48.

In an exemplary embodiment, a spring 46 has the same number of roller sections 48 as there are first seats 50 in the first seating area 42. Each roller section 48 is positioned in a corresponding first seat 50 in the first seating area 42. Likewise, in the second seating area 44, another spring 46 includes a number of roller sections 48 positioned in corresponding second seats 52. Thus, in an exemplary embodiment, at the first end 38, the spring 46 includes the same number of roller sections 48 as there are first seats 50 formed in the first seating area 42, and at the second end 40, the spring 46 includes the same number roller sections 48 as there are second seats 52 formed in the second seating area 44. In an exemplary embodiment, the spring 46 includes the same number of roller sections 48 at the first seating area 42 as a spring 46 in the second seating area 44. However, it is understood that the number of roller sections 48 formed on the springs 46 may vary, and a different number of roller sections 48 may be formed at the first end 38 than at the second end 40. It is also understood that the support portion 34 may include more first seats 50 or second seats 22 than roller sections 48 formed on the spring 46, to accommodate springs 46 having different numbers of roller sections 48.

Figure 4:
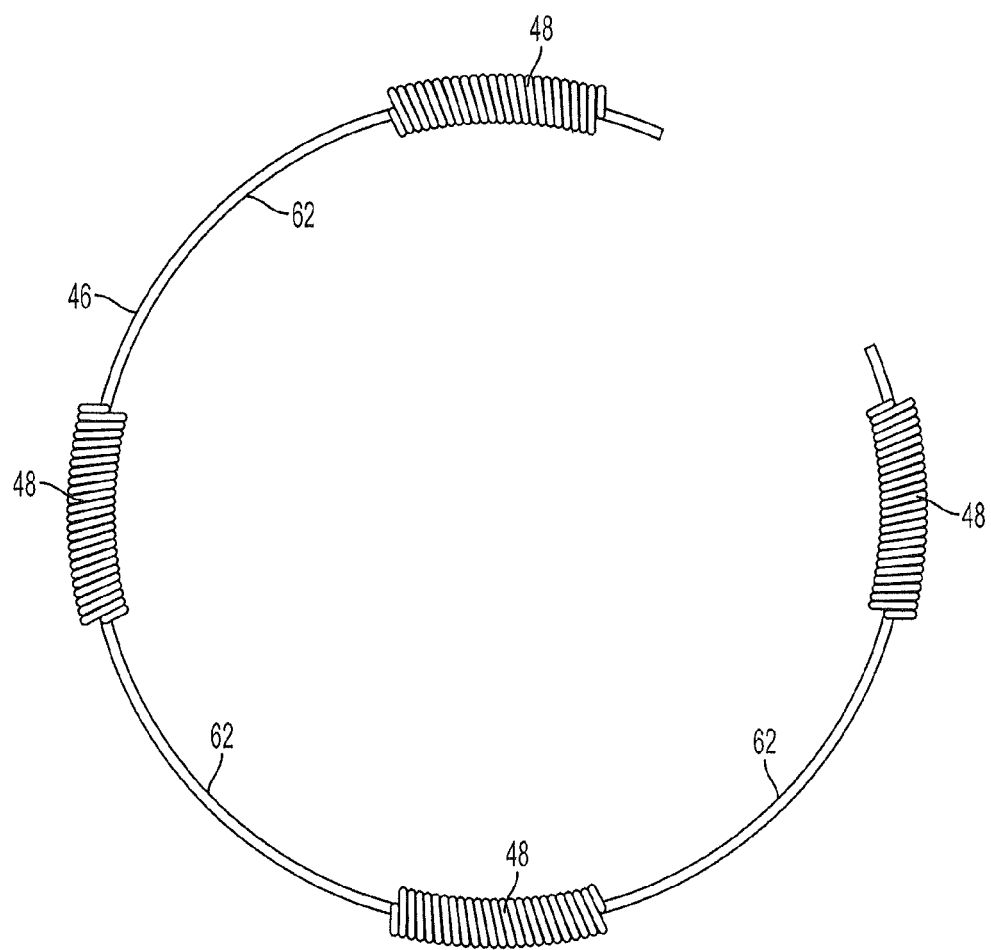
FIG. 4 illustrate a spring used in a bushing assembly according to an exemplary embodiment of the present invention.

FIG. 4 illustrates the spring 46 isolated from the steering column 10. With reference to FIG. 4, the spring 46 may be constructed from a single piece of material formed into a generally circular shape. In an exemplary embodiment, the spring 46 is not formed in to a complete circle. However, this embodiment is not limiting, and it is understood that the spring 46 may extend completely around the lower jacket 22 as suitable. The spring 46 may be a single piece of wire made from a suitable material, having sections wound into a coil to form the roller sections 48. Between roller sections 48, the spring 46 extends as an unwound wire portion 62.

Figure 5:
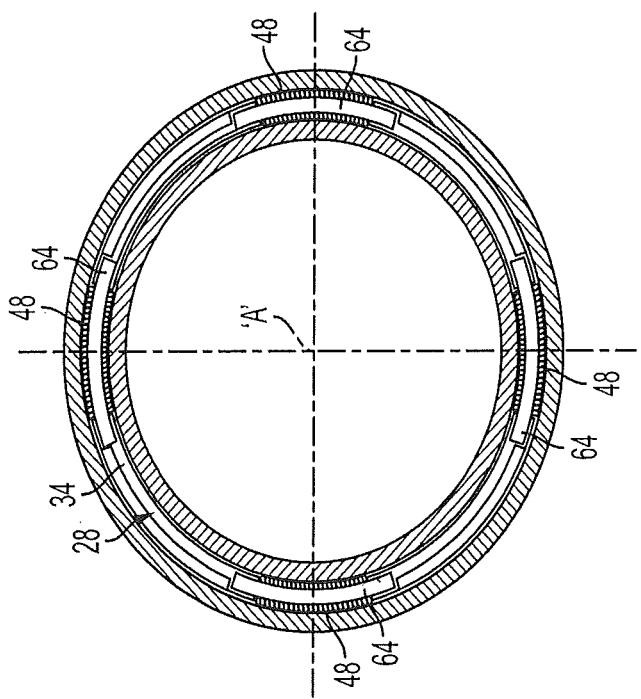
FIG. 5 illustrates a front cross section of the bushing assembly in a steering column according to another exemplary embodiment of the present invention.

FIG. 5 illustrates a cross section view of the steering column 10 in the direction of axis 'A' with a variation of the bushing 28. During a crash or impact scenario, a force applied to steering column may create a moment on the steering column urging the lower jacket 22 and/or upper jacket in a non-axial direction. Such movement may apply a force having a non-axial component to at least one roller section 48. Thus, it may be beneficial to reinforce the roller sections 48 to withstand such a force.

Accordingly, with reference to FIG. 5, a section of cable 64 may be positioned within the roller sections 48, i.e., within the coiled portion of the spring 46. The section of cable 64 may limit deformation of the roller sections 48 when a moment is applied to the steering column 10. An individual section of cable 64 may be positioned in each roller section 48

Figure 6:
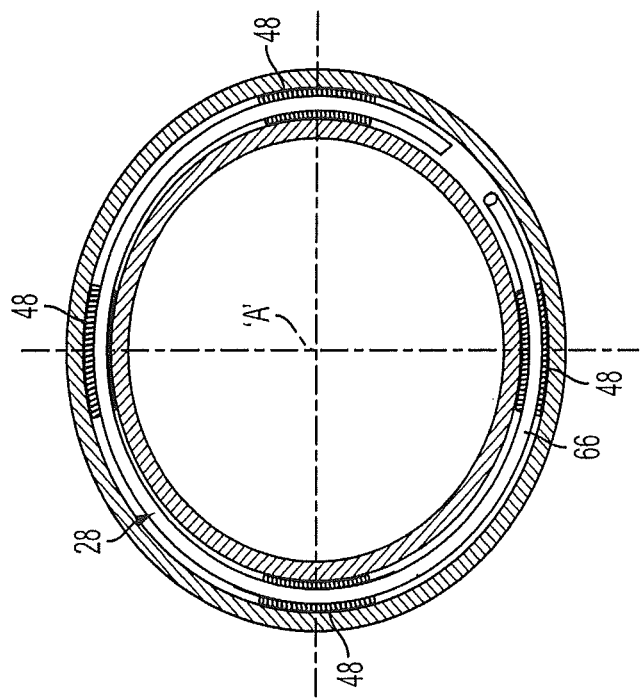
FIG. 6 illustrates a front cross section of the bushing assembly in a steering column according to still another exemplary embodiment of the present invention.

FIG. 6 illustrates a cross section view of the steering column 10 in the direction of axis 'A', with another variation of the bushing 28. To reinforce the roller sections 48, a wire hoop 66 may extend through the roller sections 48. In an exemplary embodiment, a wire hoop section 66 may be positioned within respective roller sections 48. The wire hoop section 66 may be used in place of the support portion 34 or together with the support portion 34.

It is understood that the roller sections described above are non-limiting in nature, and other types of roller sections are envisioned. For example, the roller sections may be formed rubber coated cables rather than a coiled spring section. Alternatively, the roller sections 48 may include at least one roller ball seated in the support portion 34, shown, for example, in FIG. 7.

Figure 7:
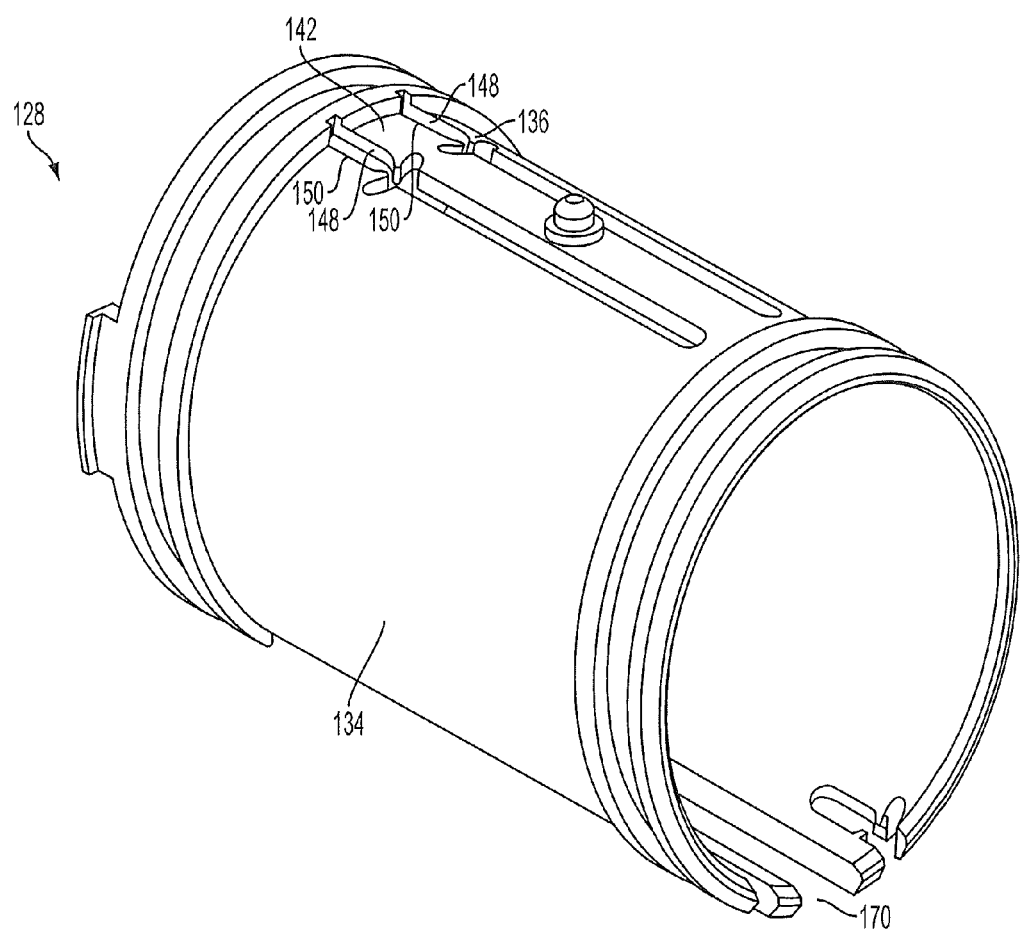
FIG. 7 is a perspective view of a bushing for a steering column according to another exemplary embodiment of the present invention.

FIG. 7 illustrates the bushing 128 according to another exemplary embodiment of the present invention. Referring to FIG. 7, the bushing 128 includes a support portion 134 and a roller portion 136. The support portion 134 extends in a circumferential direction and is generally circular. It is understood that the support portion 134 does not necessarily form a complete circle and a may include a circumferential gap 170 extending in an axial direction.

In an exemplary embodiment, the support portion 134 may also include at least one seating area 142 having at least one seat 150. The seat 150 may be formed as a longitudinally extending slot. Alternatively, the slot may extend circumferentially. In an exemplary embodiment, the at least one seating area 142 includes two seats 150, but is not limited thereto. Further, additional seating areas having at least one seat may be positioned on the support portion 134.

In an exemplary embodiment, the roller portion 136 includes at least one roller section formed as at least one roller ball 148. In one embodiment, the roller portion 136 includes a plurality of roller balls 148. With reference to FIG. 7, a plurality of roller balls 148 may be positioned in each seat 150.

The bush 128 is configured to be positioned between an outer surface 30 of the lower jacket 22 and an inner surface 32 of the upper jacket 24, as described in the exemplary embodiments above. The roller balls 148 are configured to rollingly engage at least one of the lower jacket 22 and upper jacket 24.

Figure 8:
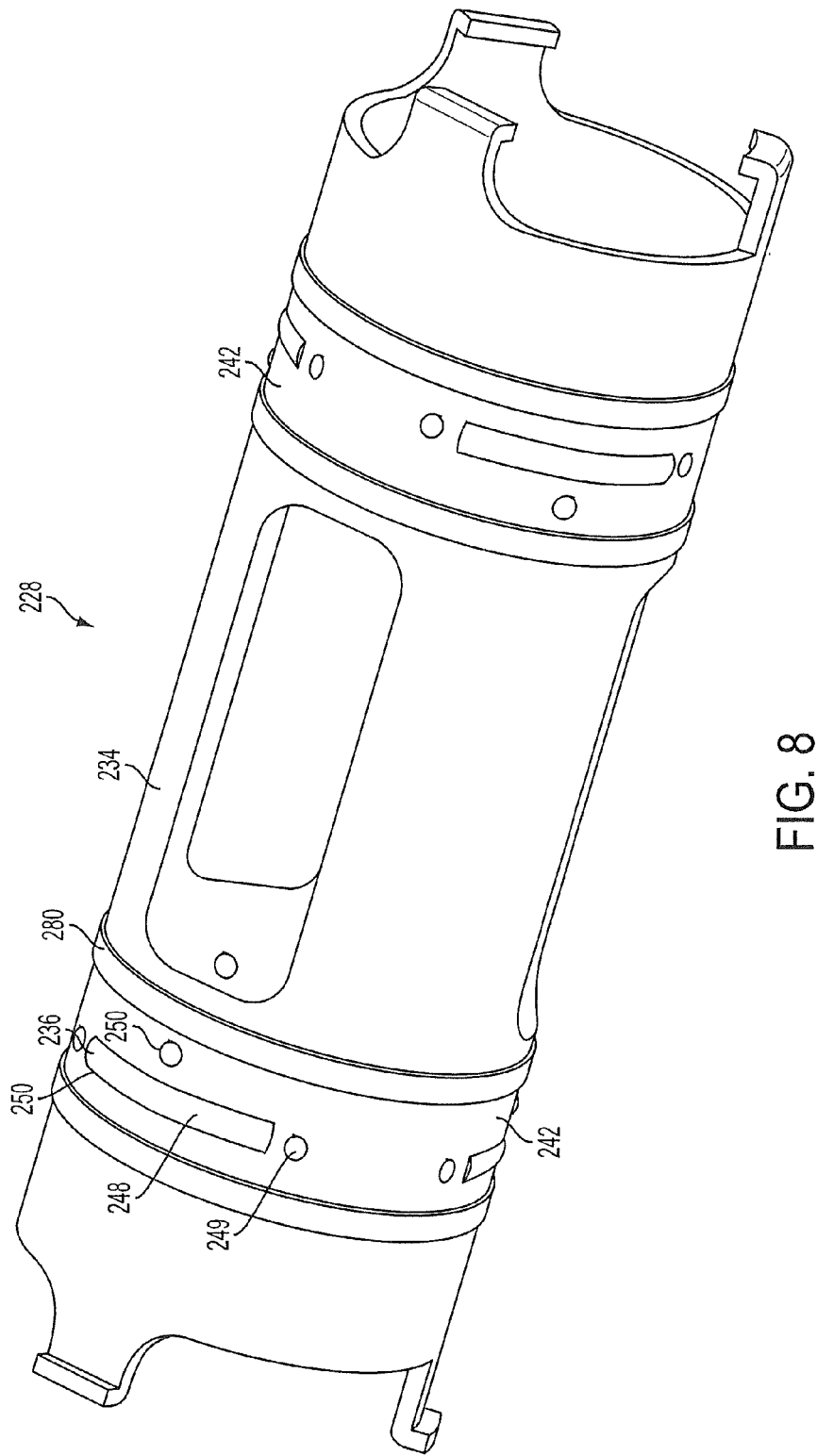
FIG. 8 is a perspective view of a bushing for a steering column according to yet another exemplary embodiment of the present invention.

FIG. 8 illustrates a bushing 228 according to yet another exemplary embodiment of the present invention. Referring to FIG. 8, the bushing 228 includes a support portion 234 and a roller portion 236. The support portion 234 extends in a circumferential direction and is generally circular.

In an exemplary embodiment, the support portion 234 may also include at least one seating area 242 having at least one seat 250. The at least one seat 250 may be formed as a circumferentially extending slot, a generally circular opening, or a combination of both. In an exemplary embodiment, the at least one seating area 242 includes a plurality of circumferentially extending slots and generally circular openings. In addition, the at least one seating area 242 may includes a two seating areas 242 positioned at different axial sections of the support portion 234. Further, additional seating areas having at least one seat 250 may be positioned on the support portion 234.

In an exemplary embodiment, the roller portion 236 includes at least one roller section. The at least one roller section includes a plurality of first roller sections formed by coiled sections 248 of springs and a plurality of second roller sections formed by roller balls 249. With reference to FIG. 8, the roller balls 249 may be seated in the generally circular seats and the coiled sections 248 may be positioned in the circumferentially extending slots. The coiled sections 248 and the spring may be formed similar to the spring 46 and roller sections 48 described above and shown in FIG. 4, for example.

The combination of the coiled sections 248 and roller balls 249 is provided to strengthen the bushing 228 in cases of high overturning moments applied to the bushing 228. In addition, the bushing 228 may include at least one strengthening section 280 adjacent to the seating areas 242. In an exemplary embodiment, the strengthening sections 280 are rings of increased thickness of the support portion 234. The strengthening sections 280 may be positioned on either or both axial sides of each seating area 242. The strengthening sections 280 are configured to provide greater resistance to deformation of the bushing 228 when high overturning moments are applied to the bushing 228.

The bushing 228 is configured to be positioned between an outer surface 30 of the lower jacket 22 and an inner surface 32 of the upper jacket 24, as described in the exemplary embodiments above. The coiled sections 248 and roller balls 249 are configured to rollingly engage at least one of the lower jacket 22 and the upper jacket 24. The strengthening sections may slidingly engage at least one of the lower jacket 22 and upper jacket 24.

In the exemplary embodiments above, a bushing having a support portion and a roller portion is provided. Accordingly, relative sliding motion may be accommodated between the lower jacket and upper jacket even in high load situations where a moment is applied to the steering column due to the roller portion of the bushing. In addition, the support portion maintains rigidity of the bushing.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An adjustable steering column for a vehicle, the adjustable steering column comprising:
   a column jacket comprising a lower jacket extending along a first axis and an upper jacket telescopically coupled to and extending with the lower jacket, the lower and upper shafts configured to selectively move telescopically relative to one another for telescope adjustment of the steering column; and
   a bushing positioned between the lower jacket and the upper jacket, the bushing comprising:
      a support portion extending along a length between the lower jacket and upper jacket, the support portion including a first seating area; and
      a roller portion positioned in the first seating area, the roller portion configured to rollingly engage at least one of an outer surface of the lower jacket and an inner surface of the upper jacket, wherein the roller portion comprises at least one spring, a cable extending within said at least one spring.

2. The adjustable steering column of claim 1, wherein said at least one spring comprises plurality of roller sections, each roller section of the plurality of roller sections is a coiled section of the at least one spring.

3. The adjustable steering column of claim 2, wherein the first seating area includes a plurality of first seats and a each roller section of the plurality of roller sections is positioned in a respective first seat.

4. The adjustable steering column of claim 3, wherein the each first seat is a window formed in the support portion.

5. The adjustable steering column of claim 1, wherein the support portion includes a first end and a second end, and the roller portion includes two roller portions positioned respectively at the first end and second end.

6. The adjustable steering column of claim 5, wherein the roller portion includes a plurality of roller sections.

7. The adjustable steering column of claim 6, wherein the roller portion is a spring and each of the plurality of roller sections is a coiled section of the spring.

8. The adjustable steering column of claim 7, wherein the support portion includes a first seating area comprising a plurality of first seats at the first end and a second seating area comprising a plurality of second seats at the second end.

9. The adjustable steering column of claim 8, wherein each of the roller sections of one roller portion are positioned in a respective first seat and a each of the roller sections of another roller portion are positioned in a respective second seat.

10. An adjustable steering column for a vehicle, the adjustable steering column comprising:
   a column jacket comprising a lower jacket extending along a first axis and an upper jacket telescopically coupled to and extending with the lower jacket, the lower and upper shafts configured to selectively move telescopically relative to one another for telescope adjustment of the steering column; and
   a bushing positioned between the lower jacket and the upper jacket, the bushing comprising:
      a support portion extending along a length between the lower jacket and upper jacket, the support portion including a first seating area; and
      a roller portion positioned in the first seating area, the roller portion configured to rollingly engage at least one of an outer surface of the lower jacket and an inner surface of the upper jacket, wherein the roller portion is a spring having a plurality of roller sections and each roller section of the plurality of roller sections is a coiled section of the spring, and
   wherein a cable extends through each coiled section of the spring to provide additional strength.

11. An adjustable steering column for a vehicle, the adjustable steering column comprising:
   a column jacket comprising a lower jacket extending along a first axis and an upper jacket telescopically coupled to and extending with the lower jacket, the lower and upper shafts configured to selectively move telescopically relative to one another for telescope adjustment of the steering column; and
   a bushing positioned between the lower jacket and the upper jacket, the bushing comprising:
      a support portion extending along a length between the lower jacket and upper jacket, the support portion including a first seating area and
      a roller portion positioned in the first seating area, the roller portion configured to rollingly engage at least one of an outer surface of the lower jacket and an inner surface of the upper jacket, wherein the roller portion is a spring having a plurality of roller sections and each roller section of the plurality of roller sections is a coiled section of the spring, and
   wherein the support portion is a wire hoop extending between the lower jacket and upper jacket and through the roller sections of the roller portion.

12. A bushing for an adjustable steering column, the bushing configured to be positioned between a lower jacket and an upper jacket of a telescoping column jacket of the adjustable steering column, the bushing comprising:
   a support portion extending in a longitudinal direction and having a first seating area; and
   a roller portion positioned in the first seating area, the roller portion having at least one roller section configured to rollingly engage at least one of the lower jacket and the upper jacket, the at least one roller section having a section through which a cable extends.

13. The bushing of claim 12, wherein the roller portion comprises a plurality of roller sections.

14. The bushing of claim 13, wherein the roller portion is a spring and each roller section of the plurality of roller sections is a coiled section of the spring.

15. The bushing of claim 13, wherein a steel cable extends through each coiled section.

16. The bushing of claim 12, wherein the support portion includes a first end and a second end, and the roller portion includes two roller portions, one roller portion positioned at the first end and the other roller portion positioned at the second end.

17. The bushing of claim 12, wherein the plurality of roller sections includes a plurality of roller balls.

18. The bushing of claim 12, further comprising at least one strengthening section, each strengthening section formed as a ring of increased thickness of the bushing extending about the bushing.

19. A bushing for an adjustable steering column, the bushing configured to be positioned between a lower jacket and an upper jacket of a telescoping column jacket of the adjustable steering column, the bushing comprising:
   a support portion extending in a longitudinal direction and having a first seating area; and
   a roller portion positioned in the first seating area, the roller portion having at least one roller section configured to rollingly engage at least one of the lower jacket and the upper jacket, wherein the roller portion comprises a plurality of roller sections, and the plurality of roller sections includes a plurality of first roller sections, each formed as a coiled section of a spring, and a plurality of second roller sections, each formed as a roller ball.

20. The bushing of claim 19, wherein the plurality of roller balls extend axially along the support portion.

21. The bushing of claim 20, wherein the plurality of roller balls includes a first plurality of roller balls extending axially along the support portion and a second plurality of balls extend axially along the support portion circumferentially spaced from the first plurality of roller balls.

* * * * *